US012350836B1

(12) United States Patent
Mishra

(10) Patent No.: US 12,350,836 B1
(45) Date of Patent: Jul. 8, 2025

(54) FACETED FINGER FOR GUIDED HAPTIC FEEDBACK

(71) Applicant: Amazon Technologies, Inc., Seattle, WA (US)

(72) Inventor: Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 254 days.

(21) Appl. No.: 17/344,503

(22) Filed: Jun. 10, 2021

(51) Int. Cl.
*B25J 9/16* (2006.01)
*B25J 15/08* (2006.01)

(52) U.S. Cl.
CPC ............. *B25J 9/1633* (2013.01); *B25J 15/08* (2013.01)

(58) Field of Classification Search
CPC ........ B25J 9/1633; B25J 15/08; B25J 9/1653; B25J 9/16669; B25J 9/1674; B25J 9/1687; B25J 9/1694; B25J 15/0009; B25J 15/0047; B25J 15/0028; B25J 15/009; B25J 15/024
See application file for complete search history.

(56) References Cited

U.S. PATENT DOCUMENTS

| 5,501,498 | A * | 3/1996 | Ulrich | F16D 43/218 294/111 |
| 11,597,092 | B1 * | 3/2023 | Alspaugh | B25J 9/1674 |
| 2014/0214202 | A1 * | 7/2014 | Nammoto | B25J 9/1653 700/245 |
| 2018/0281202 | A1 * | 10/2018 | Brudniok | B25J 15/0042 |
| 2019/0001508 | A1 * | 1/2019 | Li | G05B 13/041 |
| 2019/0152058 | A1 * | 5/2019 | Hang | B25J 9/1653 |
| 2019/0308333 | A1 * | 10/2019 | Chen | B25J 13/082 |
| 2020/0306986 | A1 * | 10/2020 | Keraly | B25J 13/085 |
| 2021/0122039 | A1 * | 4/2021 | Su | B25J 13/083 |
| 2021/0197409 | A1 * | 7/2021 | Krüger | B25J 19/007 |
| 2022/0134579 | A1 * | 5/2022 | Cao | B25J 15/12 294/86.4 |

FOREIGN PATENT DOCUMENTS

CN 106346483 A * 1/2017 ............ B25J 13/085

* cited by examiner

*Primary Examiner* — Abby Y Lin
*Assistant Examiner* — Dylan M Katz
(74) *Attorney, Agent, or Firm* — Eversheds Sutherland (US) LLP

(57) ABSTRACT

Techniques and apparatus for adaptively controlling an end-effector of a robotic arm are provided. The end-effector includes at least one articulated finger having multiple facets arranged on a surface of the at least one articulated finger. The robotic arm is moved to engage an item using the at least one articulated finger. At least one of an amount of force or an amount of torque applied to the multiple facets on the surface of the at least one articulated finger is determined while the item is engaged using the at least one articulated finger. At least one of a position and orientation of the at least one articulated finger is adaptively controlled, based on at least one of the determined amount of force or the amount of torque.

17 Claims, 13 Drawing Sheets

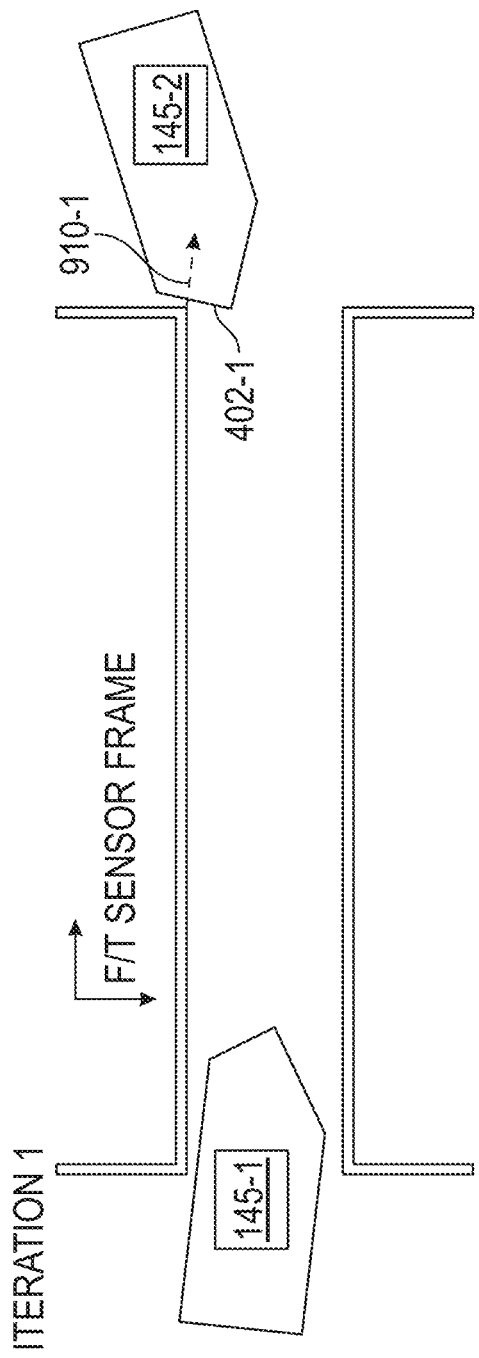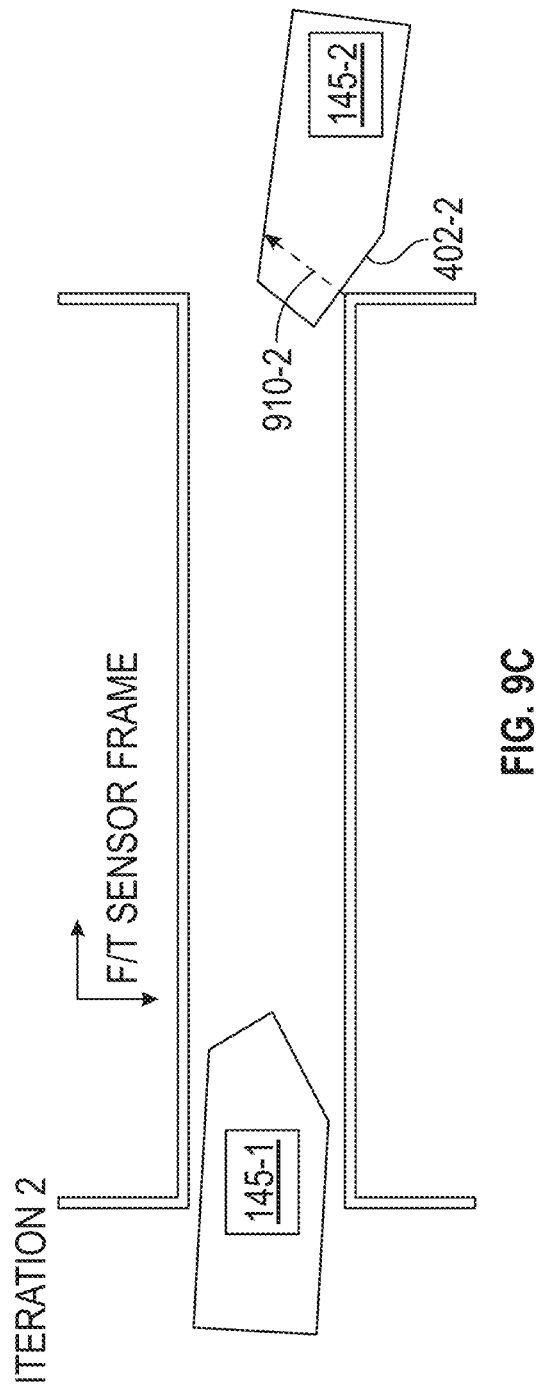

FACETED FINGER FOR GUIDED HAPTIC FEEDBACK

BACKGROUND

The present description relates to robotic systems and, more specifically, to techniques for adaptively controlling a robotic end-effector based on haptic feedback for the robotic end-effector.

Many facilities (e.g., warehouses, plants, distribution centers, storehouses, factories, etc.) use robotic systems to automate various tasks within the facility. For example, robotic systems can be used to stow items (or objects), pick items, stage items for shipping, and the like. The robotic systems can include various tools or end-effectors (also known as end-of-arm-tools (EOATs)) that interact with various objects, for example, by grasping, picking up, and manipulating objects.

The stability and reliability of a robotic tool's interaction with an object may be based on the object's size and shape. For example, the object's local surface properties, such as curvature, stiffness, deformations, friction, elasticity, etc., at the grasp point(s) can determine how stable and reliable the grasp is. In some cases, determining an object's local surface properties may be impractical or not possible.

BRIEF DESCRIPTION OF DRAWINGS

Various embodiments in accordance with the present disclosure will be described with reference to the drawings, where like designations denote like elements.

FIGS. 9A-9D illustrate an example sequence for adaptively controlling an EOAT, based on haptic feedback, according to one embodiment.

DETAILED DESCRIPTION

Embodiments herein provide techniques for adaptively controlling a robotic end effector to grasp and hold an object, based on haptic feedback from the robotic end effector. According to one embodiment described herein, a robotic system can include a robotic arm, which includes one or more articulated fingers (or end-members) as end-effectors. Each finger may be configured with facets (or planar faces) arranged in non-uniform sizes and/or shapes. The robotic system may include a haptic sensor configured to measure force and torque of each finger on the object, for a particular contact point. The robotic system can be configured with control logic that uses the force and torque feedback to learn the surface properties of the object and guide the robotic end effector to a stable grasp of the object.

By using force and torque feedback in this manner, embodiments can reliably guide the robotic end effector to a stable grasp of the object without determining the surface properties of the object. Note, as used herein, an "object" may also be referred to as an "item." Additionally, an "object" may refer to an individual object, multiple objects, a package containing an individual object, a package containing multiple objects, etc.

Figure 1:
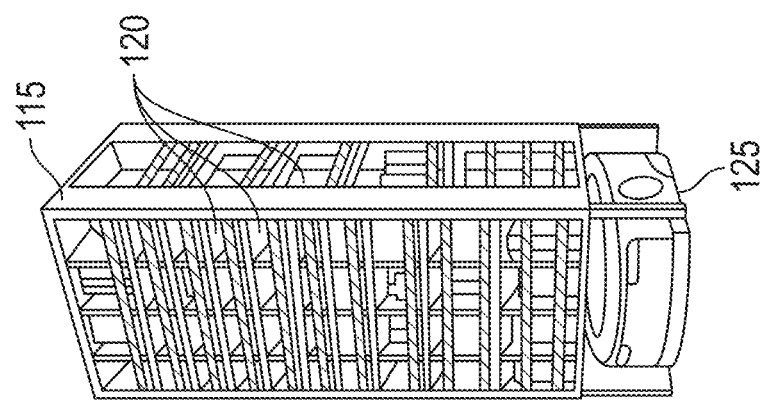
FIG. 1 illustrates an example inventory system using a robotic system to interact with objects, according to one embodiment.
Figure 1:
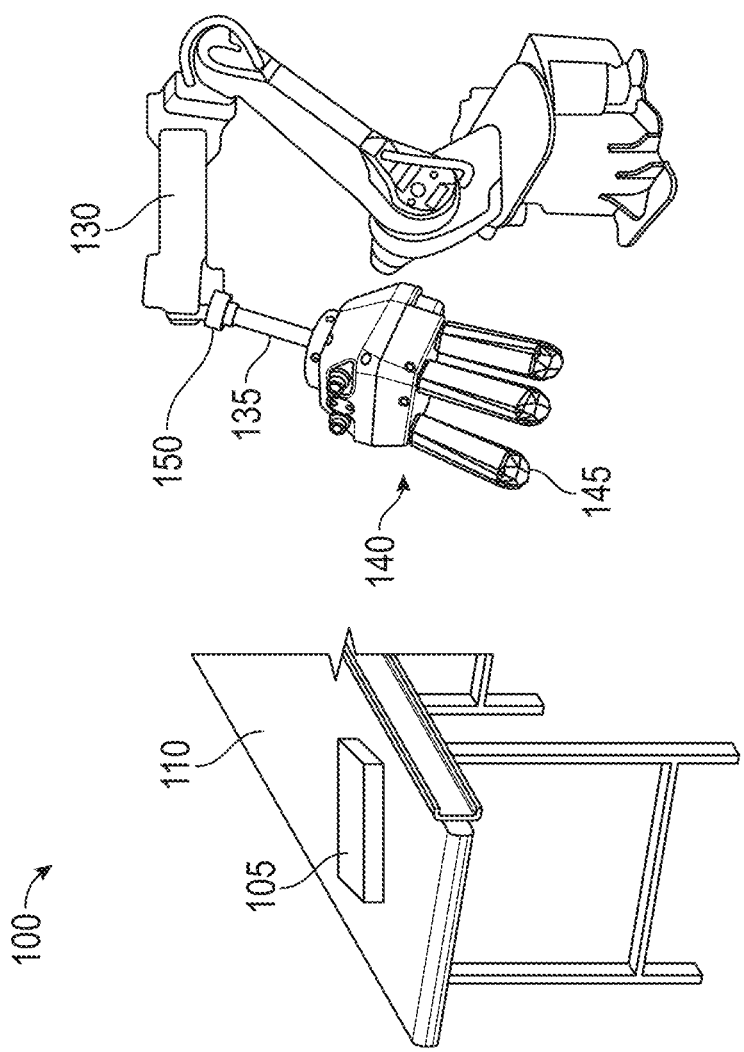

FIG. 1 illustrates an inventory system 100, according to one embodiment. The inventory system 100 may be located in a facility (e.g., warehouse, factory, distribution center, etc.). In one particular embodiment, the inventory system 100 is a robotic stowing or picking system. The inventory system 100 can be located in a fulfillment center that performs various operations in order to ship items to customers.

Here, the inventory system 100 includes a rack 115 (also referred to as an inventory holder) that includes multiple containers 120 and a robot 125 that can pick up and move the rack 115 to a particular (or desired) location. The inventory system 100 also includes a robotic arm 130 that can access the containers 120 on the rack 115, e.g., for a robotic stowing or picking operation. The rack 115 can have containers on multiple sides which can be accessed via the robot 125 spinning the rack 115 so that each side of the rack 115 can face the robotic arm 130 or a different robotic arm(s) (not shown).

In some cases, the robot 125 can move the rack 115 to a position proximate to the robotic arm 130, e.g., to enable the robotic arm 130 to stow items into (or pick items from) the containers 120. In other cases, the robotic arm 130 may be mobile and the racks 115 can be stationary. In cases where the robotic arm 130 is mobile, the robotic arm 130 may move between the racks 115 to perform stow and pick operations.

In the embodiment depicted in FIG. 1, the robotic arm 130 includes a mount 135, which can support various sensors and end-effectors (also referred to as EOATs). In the depicted embodiment, the end-effectors can be used to stow and/or pick items from the containers 120. Here, for example, the mount 135 supports one or more sensors 150, which can include, for example, haptic sensors that can determine the amount of force and/or torque applied to an item 105. The mount 135 also supports an EOAT 140, which includes three articulated fingers 145 for grasping, transporting, and stowing items into a particular container 120. Note that the EOAT 140 depicted in FIG. 1 is a reference example of an EOAT that can be used to implement the techniques described herein and that the EOAT 140 can include any number of articulated fingers and/or a different configuration for the articulated fingers.

As described in more detail below, the EOAT 140 can be guided to grasp an item 105 located in a holding area 110 (also referred to as an item holding location) with the articulated fingers 145, based on force and torque feedback for each of the articulated fingers 145 as the finger interacts with the item 105. For example, the sensors 150 may include one or more haptic sensors (also referred to as force/torque sensors) configured to measure the force and torque on each finger 145 as the finger 145 interacts (or contacts) a particular contact point on the item 105. Embodiments can use the force/torque feedback from each articulated finger 145 to guide the EOAT 140 to a stable grasp of the item 140. For example, the force/torque feedback can be used to determine a sufficient amount of force and torque that can be applied by each articulated finger 145 to a particular contact point on the item 105 by that finger, determine whether to change an orientation of the articulated finger 145 with respect to the item 105 (e.g., by translating and/or rotating the articulated finger 145), determine whether to change the point of contact of the articulated finger 145 with the item 105 (e.g., target a different contact point of the item 105), etc. By using the haptic feedback (also referred to as force/torque feedback) of each articulated finger to guide the finger to grasp the item, embodiments can avoid the significant computational cost associated with measuring and determining the local surface properties of the item.

Note that FIG. 1 illustrates a reference example of an environment (e.g., picking and/or sorting system) in which the techniques described herein for adaptively controlling a robotic arm end-effector, based on haptic feedback can be used. For example, while the holding area 110 is depicted as a conveyor, the holding area 110 can include any form factor (e.g., table, floor, bin, pallet, cart, etc.) suitable for holding items. In general, the techniques described herein can be implemented in any environment in which a robotic arm end-effector is used to interact with objects (or items).

Figure 2:
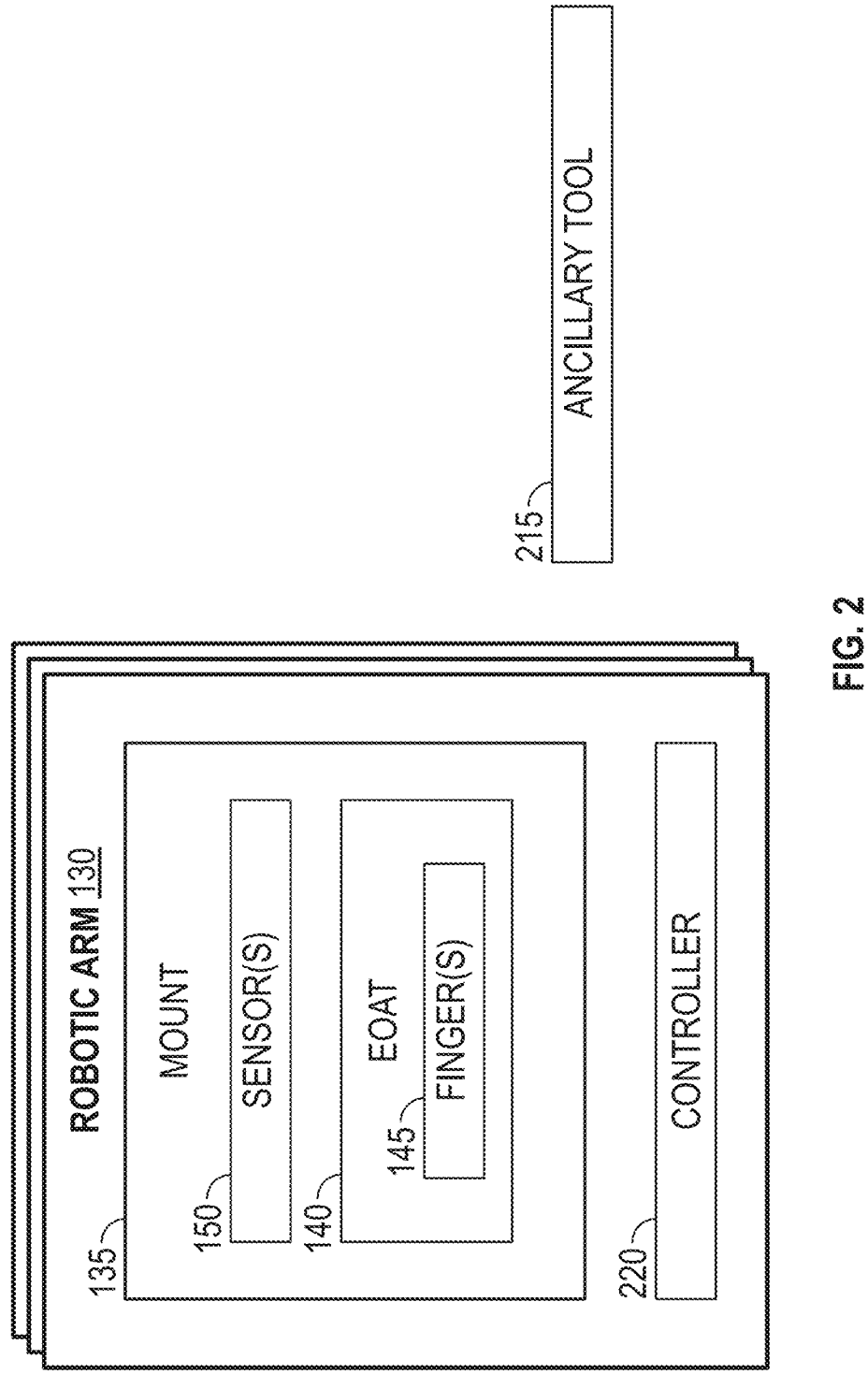
FIG. 2 is a block diagram of a robotic arm, according to one embodiment.

FIG. 2 is a block diagram of the robotic arm 130, according to one embodiment. Although one robotic arm 130 is depicted, there may be any number of robotic arms 130 located in a given facility. The robotic arm 130 may support various components used for interacting with objects (e.g., a robotic stowing (or picking) operation). Here, the robotic arm 130 includes a mount 135 and a controller 220. The mount 135 supports one or more sensors 150 and an EOAT 140. In some embodiments, a robotic arm 130 can have multiple EOATs. In embodiments with multiple robotic arms, the robotic arms can have the same or different sensor(s) 205 and/or the same or different EOATs 140.

The sensor(s) 150 can include a visual sensor, depth sensor, infrared sensor, barcode reader, force sensing sensor, torque sensing sensor, pressure sensor, gyroscope, accelerometer, or combinations thereof. The sensor(s) 150 can be any sensor that permits the inventory system 100 to identify occupied versus empty space in the container, identify the arrangement of items in the container, identify the type or number of items in the container, determine an amount of (squeeze) force applied to an item, determine an orientation of the EOAT 140, identify the individual items in the container, and the like.

The sensor(s) 150 can be disposed in different locations on the robotic arm 130. For example, while FIG. 2 illustrates coupling the sensor(s) 150 to the mount 135, the sensor(s) 150 can be mounted elsewhere. For example, the sensor(s) 150 can be mounted to one or more of the articulated fingers 145 of the EOAT 140. In one embodiment described herein, the sensor(s) 150 is a haptic sensor (or force/torque sensor) configured to measure the force and torque applied to the articulated finger while the finger engages an item (e.g., item 105) at a candidate contact point of the item. As described below, the haptic sensor can enable the robotic arm 130 to translate and/or rotate the articulated fingers 145 with respect to the item so that the articulated fingers 145 can achieve a stable grasp of the item. The haptic sensor may be a six-axis force/torque sensor that can measure both the force and torque along three axes (X, Y, Z). The haptic sensor can be implemented with a variety of different types of force/torque sensors, including, for example, strain gauge, capacitive, and optical.

The controller 220 can be used to control movement of the robotic arm 130 and/or EOAT 140. In one example, the controller 220 can receive instructions from another computing system (not shown) for controlling the robotic arm 130 and/or EOAT 140. In another example, the controller 220 can control movement of the robotic arm 130 and/or EOAT 140, based on information obtained via the sensor(s) 150. For instance, as described below, the controller 220 can be configured to control movement of the robotic arm 130 and/or the BOAT 140, based on the force/torque feedback of each articulated finger 145 (measured by a haptic sensor) as the EOAT 140 engages with an item. Although depicted as a part of the robotic arm 130, in some embodiments, the controller 220 can be separate from the robotic arm 130 (e.g., located on another computing system).

In addition to the components of the robotic arm 130, the inventory system 100 can include an ancillary tool 215 that supports the operations performed by the robotic arm 130. For example, one of the sensors 150 or the tools (e.g., EOAT 140) on the mount 135 may instead be attached to the ancillary tool 215. In another example, the controller 220 may be located on the ancillary tool 215. In one embodiment, the ancillary tool 215 may be a conveyor belt that moves items to or from the robotic arm 130. For example, when doing a stow operation, the conveyor belt may bring the item to the robotic arm 130 where it is grasped by the EOAT 140. The robotic arm 130 can then move the EOAT 140 to a selected container and stow the item. When doing a pick operation, after the EOAT 140 retrieves the item from a container, the robotic arm 130 can move the EOAT 140 to an unloading zone when the item is placed on the conveyor belt and moved to a different portion of the facility.

Figure 3A:
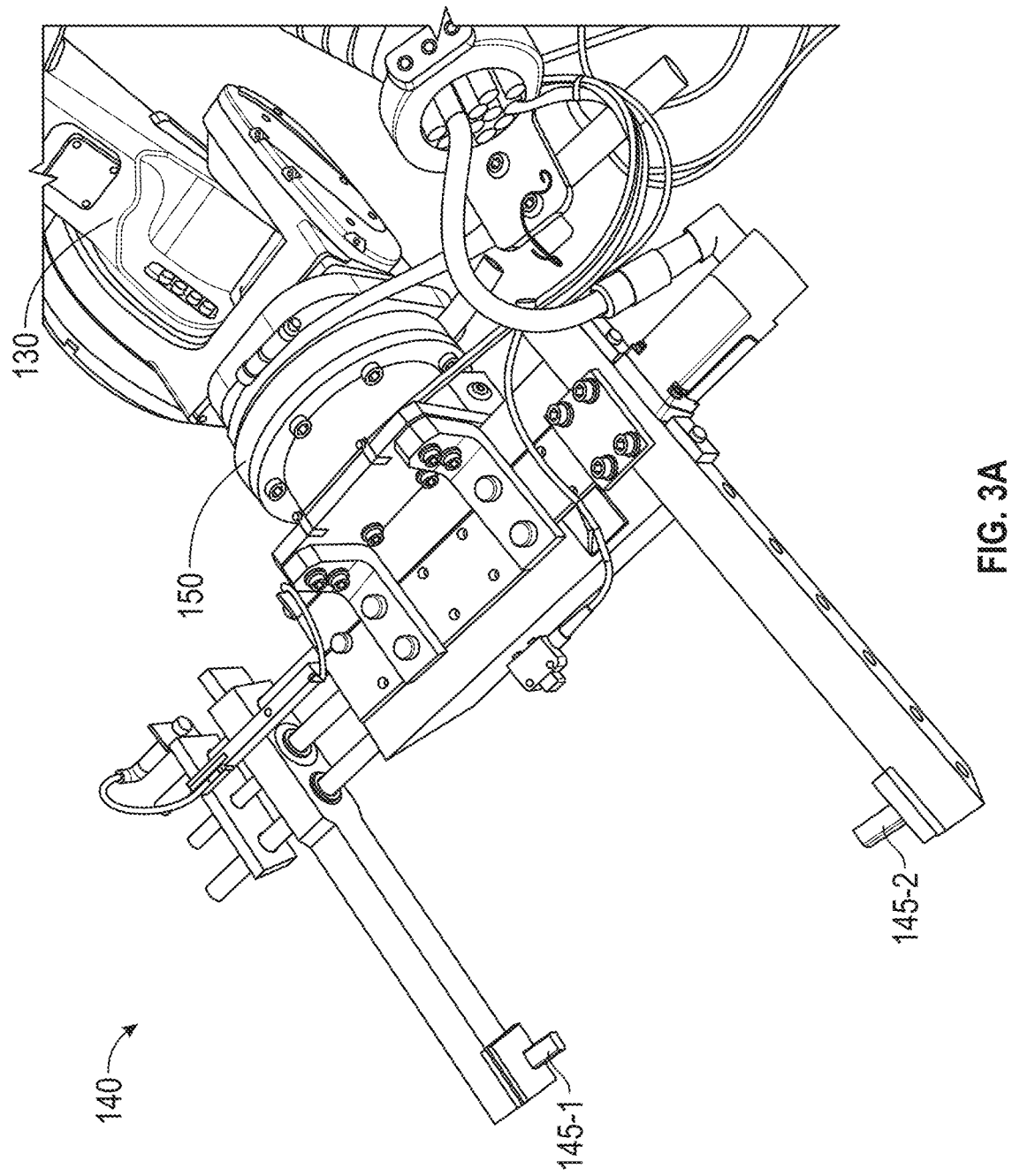
FIG. 3A illustrates a perspective view of an example EOAT of a robotic arm, according to one embodiment.
Figure 3B:
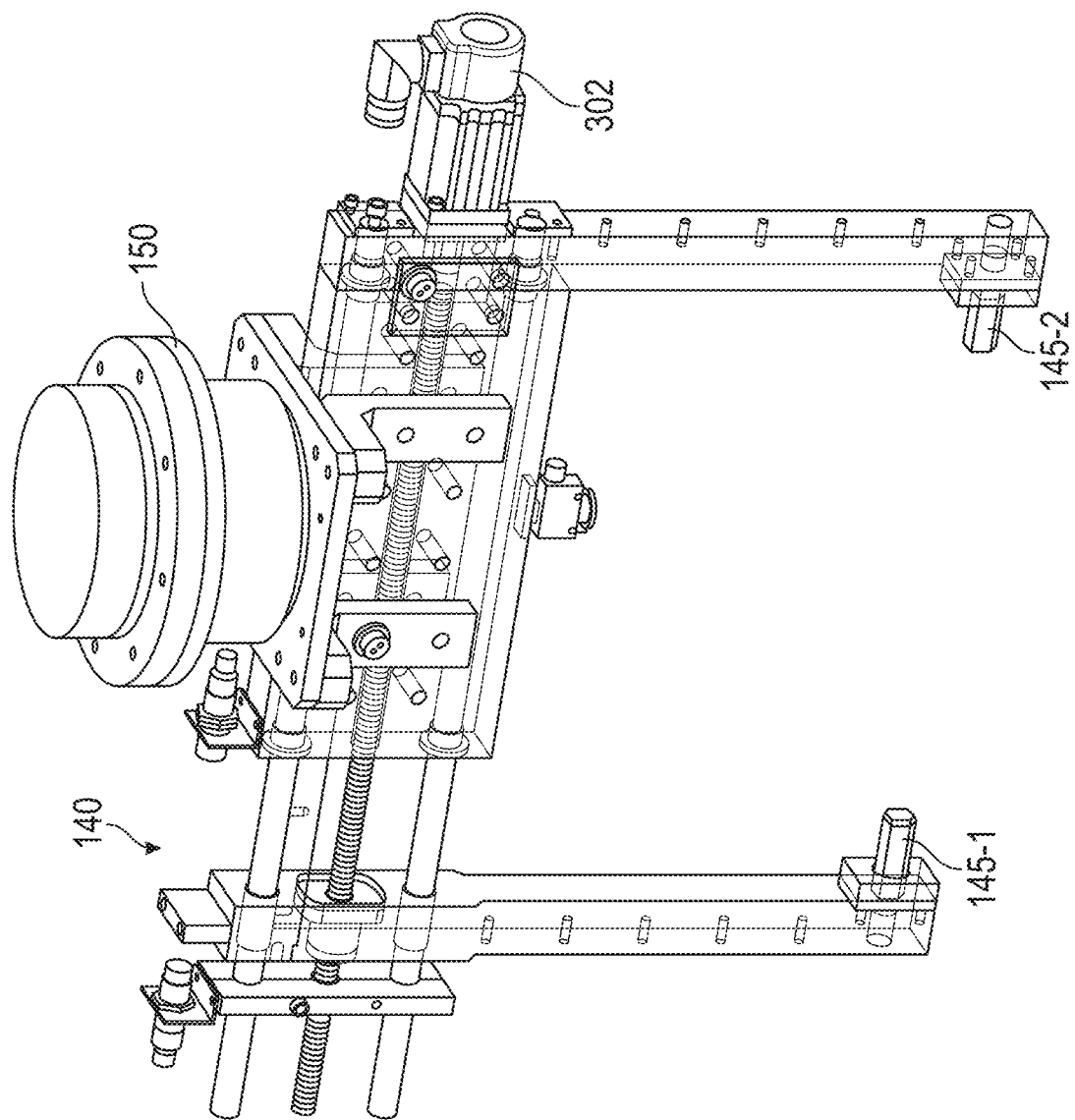
FIG. 3B illustrates another perspective view of an example EOAT of a robotic arm, according to one embodiment.

FIGS. 3A-3B illustrate different perspective views of an example EOAT 140, according to one embodiment. As shown in this particular embodiment, the EOAT 140 includes two articulated fingers 145-1 and 145-2. The translation and/or rotation of the articulated fingers 145 1-2 may be controlled by a motor 302 (e.g., via the controller 220). In one embodiment described below, the articulated fingers 145-1, 145-2 can be used to grasp an item by engaging insertion holes on the item (e.g., each articulated finger 145 can be inserted into a different hole on the item).

Figure 4:
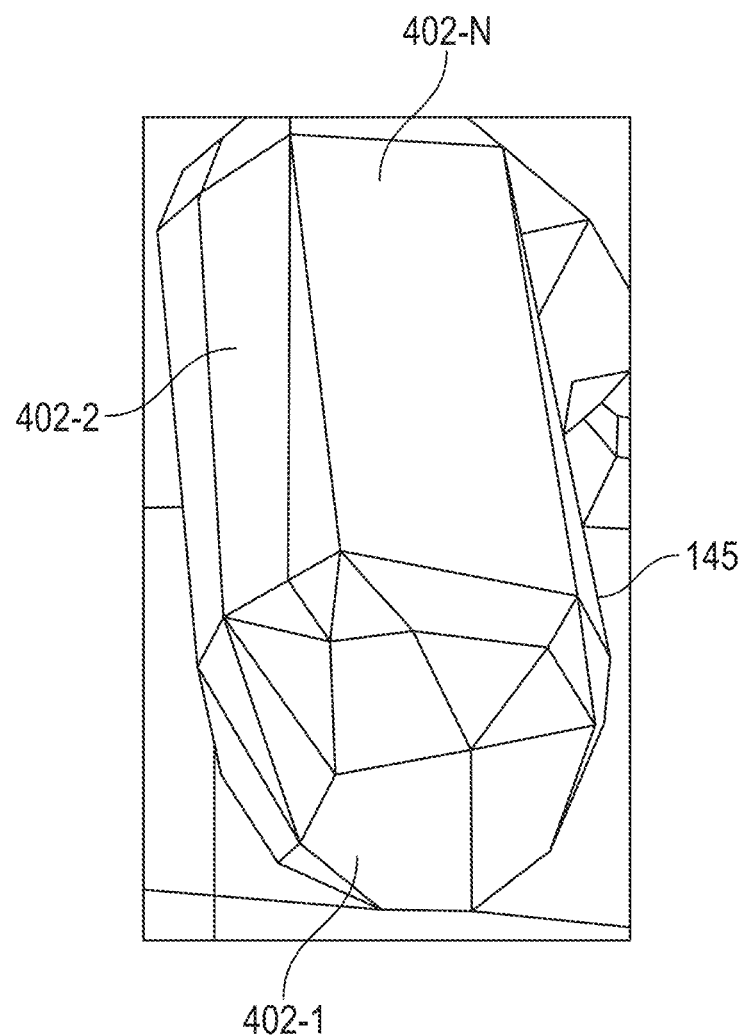
FIG. 4 illustrates an example of an articulated finger of an EOAT, according to one embodiment.

As shown in FIG. 4, in one embodiment, the articulated finger(s) 145 of the EOAT 140 may be configured with multiple planar faces 402 with edges. As used herein, a planar face may be referred to as a facet. Each articulated finger 145 may have a random configuration of facets 402 1-N(or planar faces). For example, the facets may be non-uniformly arranged on the surface of the articulated finger 145, the facets may have non-uniform shapes, the facets may have non-uniform sizes, etc. Additionally or alternatively, each articulated finger 145 may have a random number of facets 402. The random facet configuration of an articulated finger 145 may enable the controller 220 of the robotic arm 130 to uniquely discriminate the curvature and local shape properties of an item. The random facet configuration may also enable the controller to guide the fingers 145 of the EOAT to a stable grasp without the need to use conventional tools (e.g., cameras, meshes or models of the item) to determine the non-geometrical contact properties between the fingers 145 and the item. For example, the random configuration of facets 402 on a finger 145 can enable the controller 220 to learn how to move (e.g., translate and/or rotate) the finger 145, based on the haptic feedback that is sensed as the finger 145 engages (e.g., grasps, contacts, picks, etc.) the item. In particular, the controller 220 can be configured to move each finger 145 with respect to the item to minimize the slip and/or slide of the item's surface against the contact point (e.g., one of the facets 402) of the finger 145.

Figure 5:
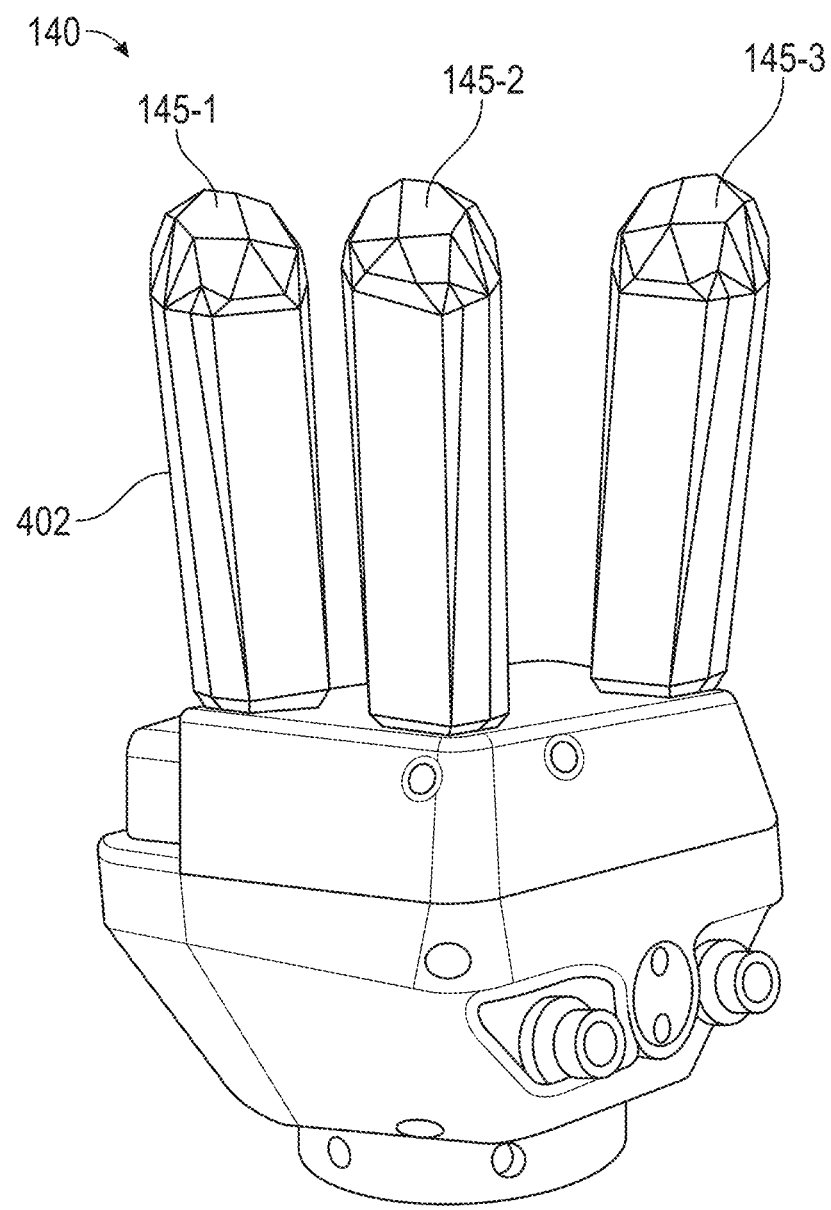
FIG. 5 illustrates a perspective view of another EOAT of a robotic arm, according to one embodiment.

Note that FIGS. 3A-3B illustrate a reference example of a configuration of a EOAT 140, and that the EOAT 140 can have different configurations with different numbers of articulated fingers. FIG. 5, for example, illustrates another example EOAT 140 with three articulated fingers 145 1-3. In the embodiment depicted in FIG. 5, the articulated fingers 145 1-3 may be used to grasp an item by engaging at least one planar face 402 of each articulated finger 145 against a surface of the item with a sufficient amount of force/torque to prevent (or minimize) the surface of the item from slipping against the planar face 402 of the articulated finger 145. As shown in FIG. 5, each articulated finger 145 1-3 has a different configuration of facets (e.g., size, shape, number, etc.) on the surface of the finger 145.

In some cases, the robotic arm 130 can initially approach an item with the EOAT 140 in a first orientation (e.g., the articulated fingers 145 may be moved to a particular orientation), based on a prior (or known) understanding of the shape of the item. In some cases, the shape of the item may be determined by recognizing the shape of the item and the item's pose (e.g., position and orientation), e.g., using one or more cameras. The first orientation may be determined based on an approximation of the shape and/or pose of the item. For example, a small number of contact points and a small subset of surface normal at those contact points can be used to determine the first orientation of the EOAT 140.

After approaching the item 105 with the EOAT 140 in the first orientation, the controller 220 can use the haptic feedback from the finger(s) 145 to determine how to move the finger(s) 145 with respect to the surface of the item 105 in order to achieve a stable grasp of the item (e.g., by minimizing the slip and/or slide of the item's surface against a contact point of the finger(s)).

Figure 6:
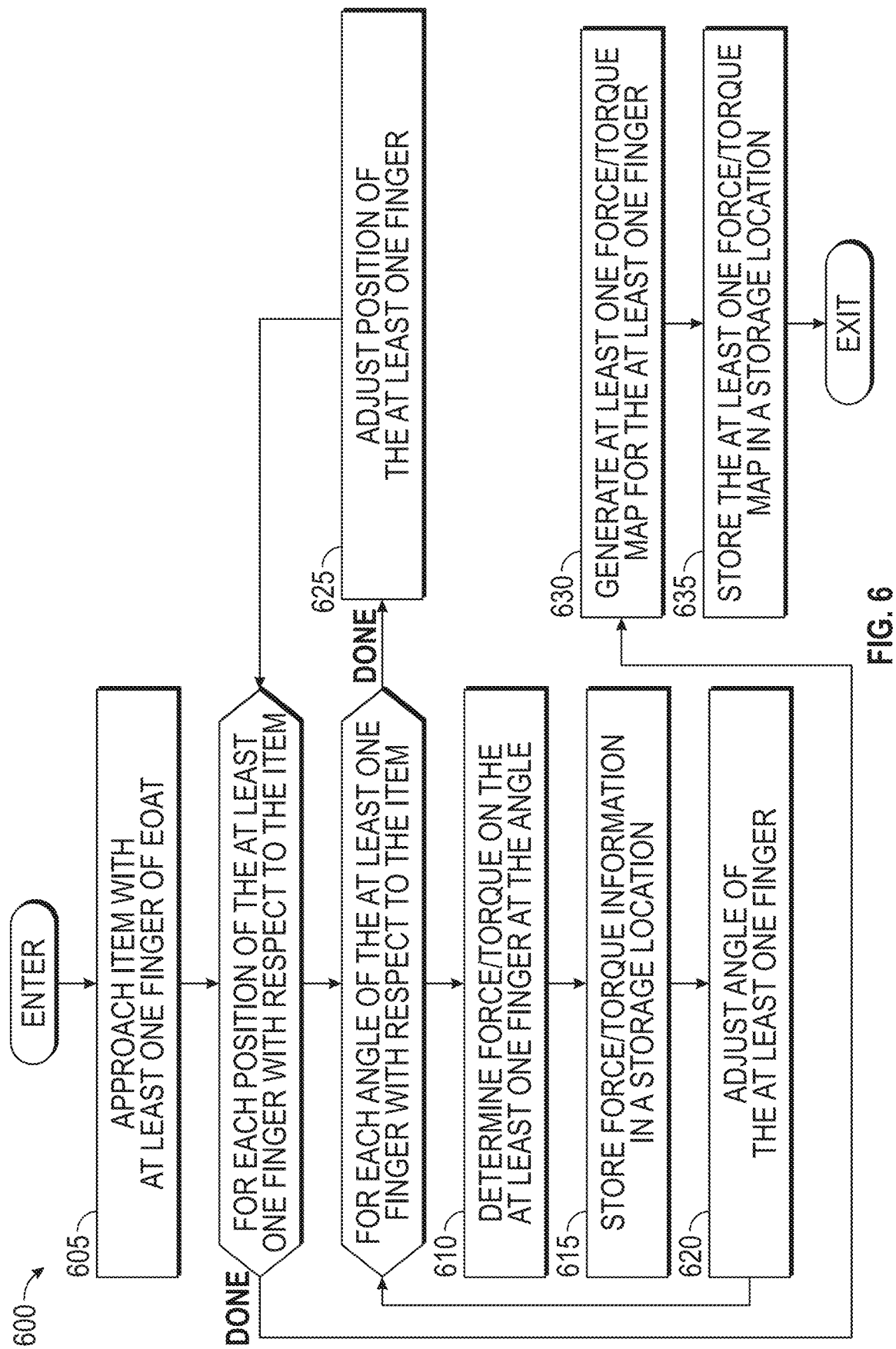
FIG. 6 is a flowchart of a method for learning the surface properties of an object, according to one embodiment.

As noted, the random configuration of facets on an articulated finger 145 can enable embodiments to learn (or infer) at least some of the local surface properties of an object (without the computational complexity associated with capturing images of the object, generating and analyzing a mesh or model of the object). FIG. 6 is a flowchart of a method 600 for learning the local surface properties of an object, according to one embodiment. The method 600 may be performed by one or more components of the inventory system 100.

Method 600 may enter at block 605, where the robotic arm (e.g., robotic arm 130) approaches the item with at least one finger (e.g., articulated finger 145) of an EOAT (e.g., EOAT 140). The robotic arm may approach the item in response to commands received from a controller (e.g., controller 202). The robotic arm may control, via the controller, the position and angle of the at least one finger with respect to the item to learn the local surface properties of the object.

For example, for each position of the at least one finger with respect to the item and for each angle of the at least one finger at the position, the controller may determine the force/torque on the at least one finger at the angle/position (e.g., using sensor 150) (block 610). In particular, the controller may determine the force/torque on at least one facet (e.g., facet 402) that contacts a particular contact point on the item (at the angle/position). The controller may store the force/torque information in a storage location (e.g., database, cloud storage, etc.) (block 615). At block 620, the controller may adjust the angle of the at least one finger. For example, the controller may adjust (e.g., increment) the angle by a predetermined amount.

After performing the operations in blocks 610, 615, and 620 for each angle at a given position of the at least one finger, the controller may adjust the position of the at least one finger (e.g., by a predetermined amount) (block 625) and repeat the operations in blocks 610, 615, and 620. At block 630, a force/torque map may be generated for the at least one finger, based on the stored force/torque information. The force/torque map may be generated by the controller or by another device (e.g., offline). At block 635, the force/torque map is stored in a storage location. The method 600 may then exit.

Figure 7:
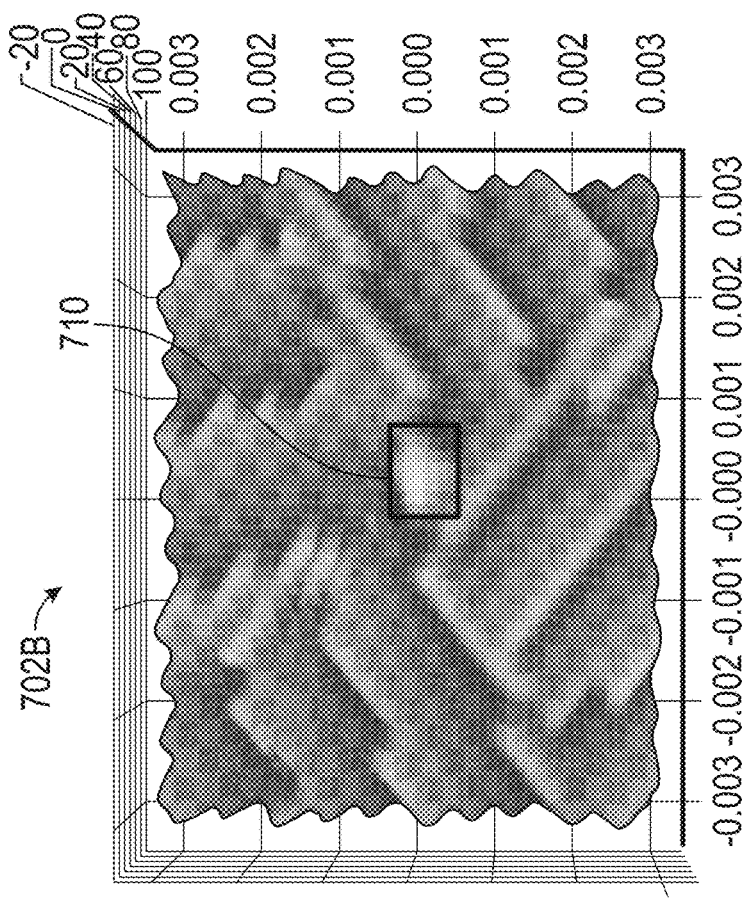
FIG. 7 illustrates a force/torque map for an articulated finger of an EOAT, according to one embodiment.
Figure 7:
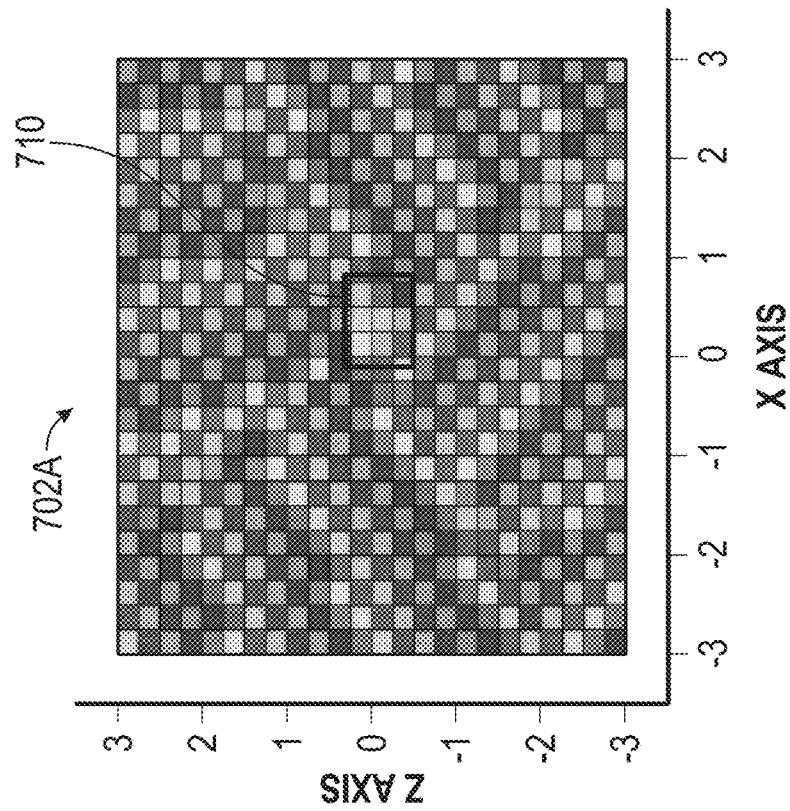

FIG. 7 illustrates a two-dimensional (2D) map 702A and a three-dimensional (3D) map 702B of the force/torque experienced by an articulated finger 145 as it engages an object, according to one embodiment. In one embodiment, the maps 702A and 702B may be generated using the method 600 depicted in FIG. 6. Here, the maps 702A and 702B depict the force applied to the articulated finger 145 while the articulated finger 145 is moved in the Y direction with respect to a cubic-shaped object (e.g., a box). For example, the maps 702A and 702B can be generated by rolling (or rotating) the articulated finger to contact the object (e.g., at different angles) while the articulated finger is translated in the Y direction. Embodiments can generate learned maps (e.g., similar to maps 702A and 702B) for different types of objects and store the generated maps in a storage location (e.g., database). Embodiments can retrieve a particular learned map for a given type of object when determining how to guide each articulated finger to a stable grasp of the object corresponding to the object type. In maps 702A and 702B, for example, the stable region is represented by area 710.

Figure 8:
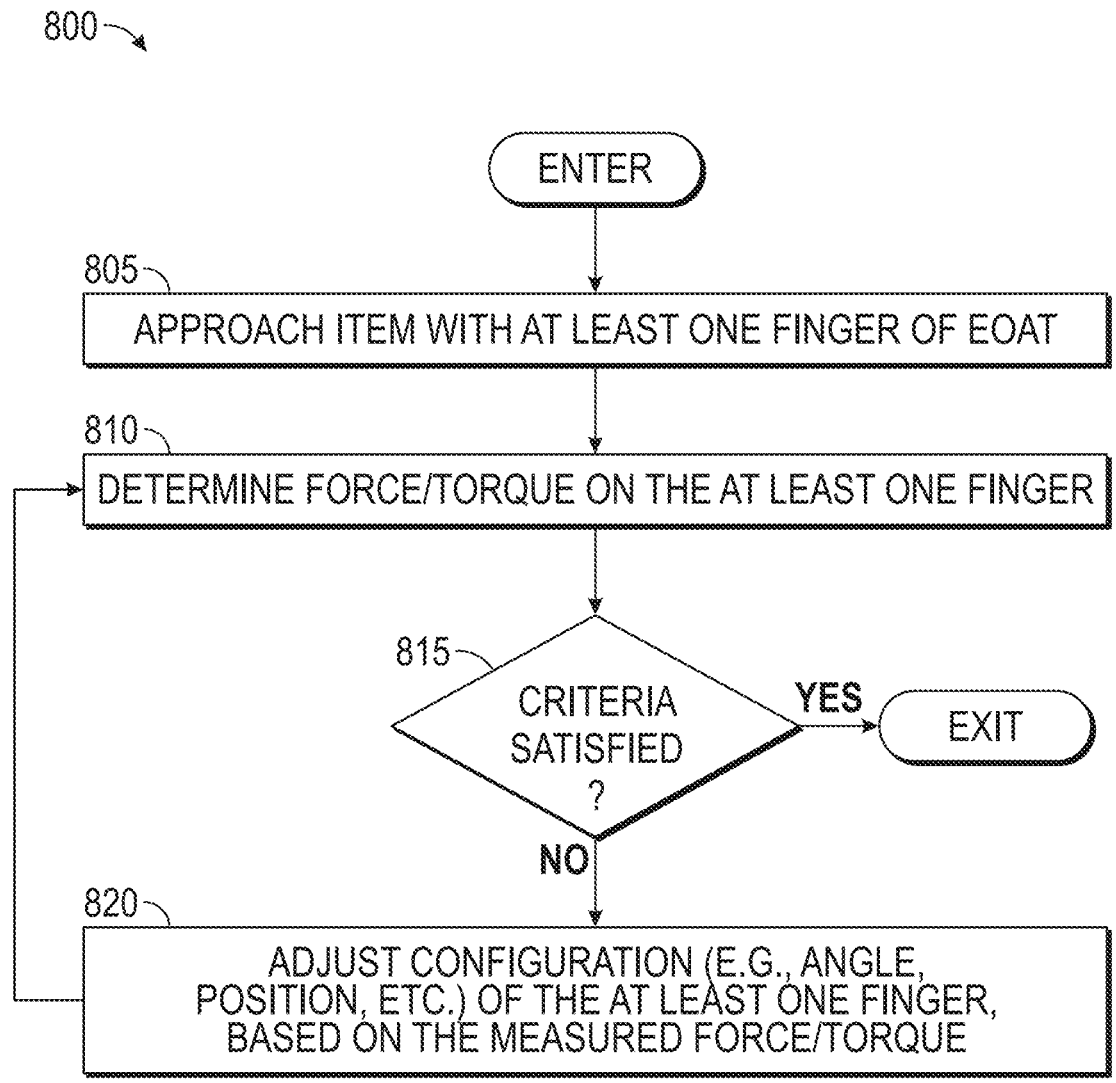
FIG. 8 is a flowchart of a method for adaptively controlling an EOAT of a robotic arm, according to one embodiment.

FIG. 8 is a flowchart of a method 800 for adaptively controlling an EOAT (e.g., EOAT 140) of a robotic arm (e.g., robotic arm 130), according to one embodiment. The method 800 may be performed by one or more components of the inventory system 100.

Method 800 may enter at block 805, where the robotic arm (e.g., robotic arm 130) approaches an item (e.g., item 105) with at least one finger (e.g., articulated finger 145). The robotic arm may approach the item in response to commands received from a controller (e.g., controller 202). As noted, the robotic arm may approach the item with the at least one finger in a pre-defined configuration (or orientation). The pre-defined configuration may be based on a priori knowledge of at least one of the shape and/or pose of the item.

At block 810, the controller determines the force/torque on the at least one finger. For example, the controller may measure the force/torque experienced by the at least one finger via a sensor (e.g., sensor 150) located on the robotic arm. At block 815, the controller determines whether one or more criteria is satisfied. In one embodiment, the criteria may include force/torque feedback that indicates a stable grasp of the item. A stable grasp of the item may be determined when the force/torque feedback is minimized (e.g., less than a threshold), the rate of change of the force/torque is minimized (e.g., less than a threshold), a number of iterations have been performed, etc.

If, at block 815, the criteria are not satisfied, then the controller adjusts the configuration (e.g., angle, position, etc.) of the at least one finger, based at least in part on the measured force/torque on the at least one finger (block 820).

In some embodiments, the controller can determine the adjusted configuration based on a learned force/torque map for the at least one finger (e.g., maps 702A and 702B) associated with a type of the item (e.g., cubic shaped item). On the other hand, if at block 815, the criteria are satisfied, then the method 800 exits.

Figure 9A:
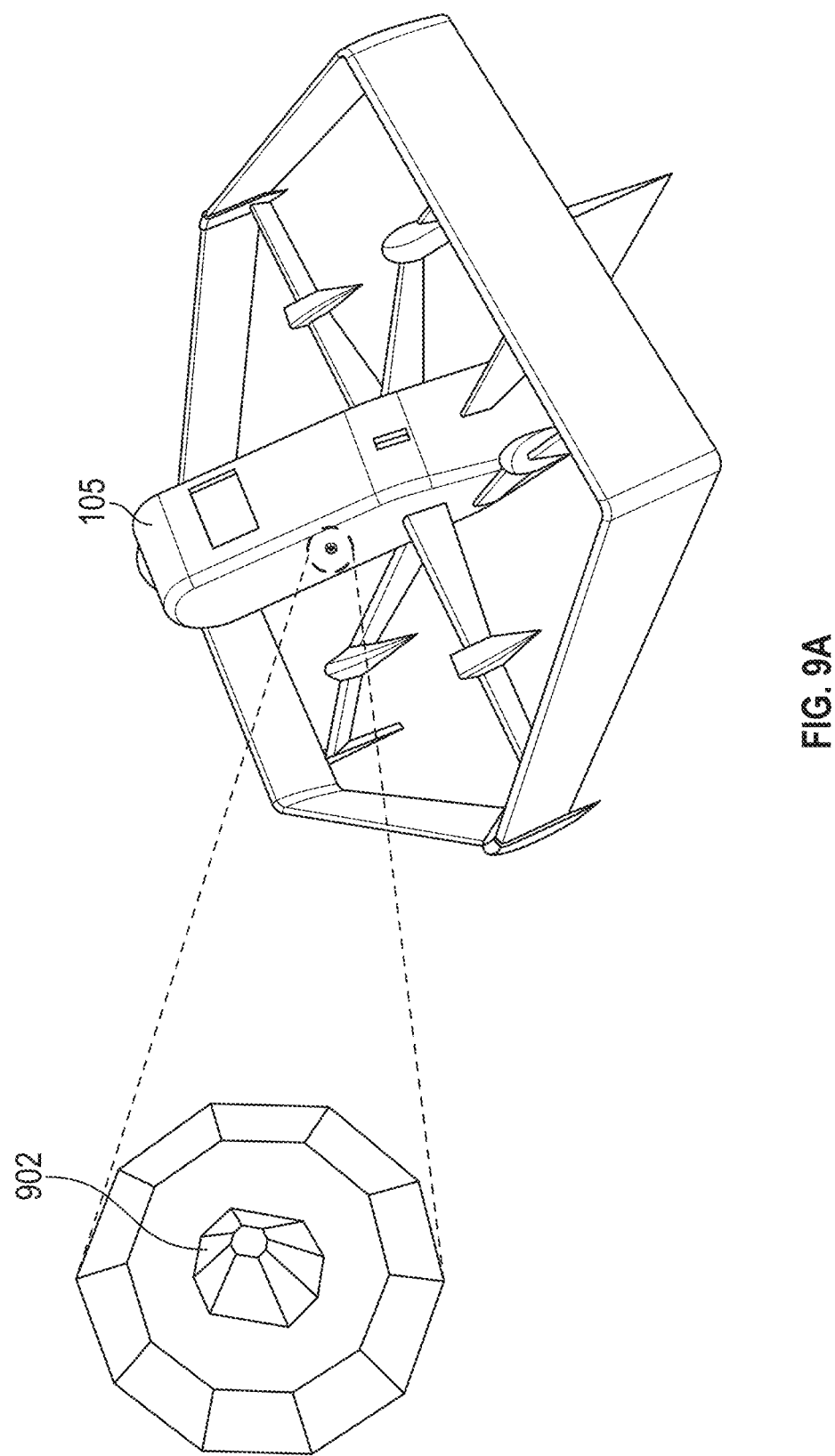
Figure 9D:
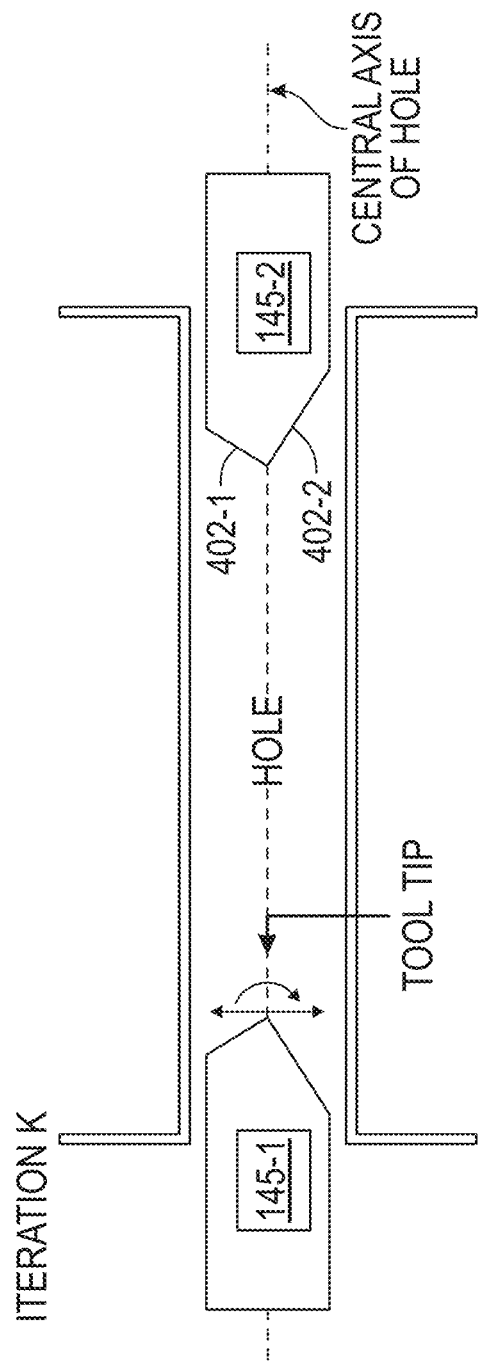

FIGS. 9A-9D illustrate an example sequence for adaptively controlling an EOAT, based on haptic feedback, according to one embodiment. As shown in FIG. 9A, the EOAT 140 (e.g., EOAT 140 depicted in FIGS. 3A-3B) may be used to interact with an item 105 (depicted in this embodiment as a "drone"). For example, the item 105 can include one or more insertion holes 902, which the articulated fingers 145 of the EOAT 140 can engage (e.g., by inserting the articulated finger 145 into the insertion hole 902) in order to interact (e.g., grasp, pick up, manipulate, etc.) with the item 105.

As shown in FIG. 9B, in a first iteration, the EOAT 140 may approach the item 105 in a configuration in which the articulated finger 145-1 and the articulated finger 145-2 are misaligned with respect to a central axis of the hole 902 (shown in FIG. 9C, for example). Using the finger 145-2 as a reference example, in this configuration, the facet 402-1 of the finger 145-2 may contact the item 105 at an edge of the hole 902. Upon contacting the hole, the force/torque on the facet 402-1 can be measured (e.g., via a sensor 150) and used to correct the configuration (e.g., position and/or angle) of the finger 145-2. In one embodiment, two sets of force/torque readings can be obtained for each contact point. For example, for the force/torque vector 810-1 on facet 402-1, the normal components of the force/torque (referred to herein as the normal force/torque) and the tangential components of the force/torque (referred to herein as the tangential force/torque) can be obtained (via the sensor 150).

In one embodiment, the controller 220 can determine, based on the amount of the tangential force, whether the finger 145-2 will be able to slide into the insertion hole 802. For example, if the tangential force/torque is above a predetermined threshold, then the controller 220 may determine that item 105 is sliding and/or slipping against the finger 145-2 and may adjust the configuration (e.g., position and/or angle) of the finger 145-2. On the other hand, if the tangential force/torque is below a predetermined threshold, then the controller 220 may determine that the item 105 is positioned such that it can slide into the hole 902.

As shown in a subsequent iteration (e.g., iteration 2) in FIG. 9C, the controller 220 adjusts the position and angle of the finger 145-2, such that it engages the item 105 at a different edge of the hole 902. Similar to FIG. 9B, upon engaging the hole, the normal force/torque and the tangential force/torque on the facet 402-2 can be determined (e.g., via the sensor 150), based on the force/torque vector 910-2. The tangential force/torque measurement can then be used to correct the configuration (e.g., position and/or angle) of the finger 145-2.

The controller 220 may continually adjust the configuration of the finger 145-2, based on the force/torque feedback for the finger 145-2, until the controller 220 determines that the finger 145-2 will be able to slide into the hole 902 (e.g., achieve a stable grasp, where the tangential force is minimized). As shown in FIG. 9C, for example, in a subsequent iteration (e.g., iteration K), the finger 145-2 is in a configuration where it is aligned with the central axis of the hole 902, allowing the finger 145-2 to slide into the hole 902 and grasp the item 105.

Note that while FIGS. 9A-9D are described with respect to finger 145-2, a similar process may be performed for finger 145-1 in order to enable the finger 145-1 to slide into its respective hole 902. In some embodiments, the controller 220 may guide each respective finger 145 independently of other fingers of the EOAT. Additionally, note that while FIGS. 9A-9D are described with respect to engaging an object with insertion holes, a similar process may be performed for engaging other types of objects (e.g., boxes, packages, bags, etc.).

Figure 10:
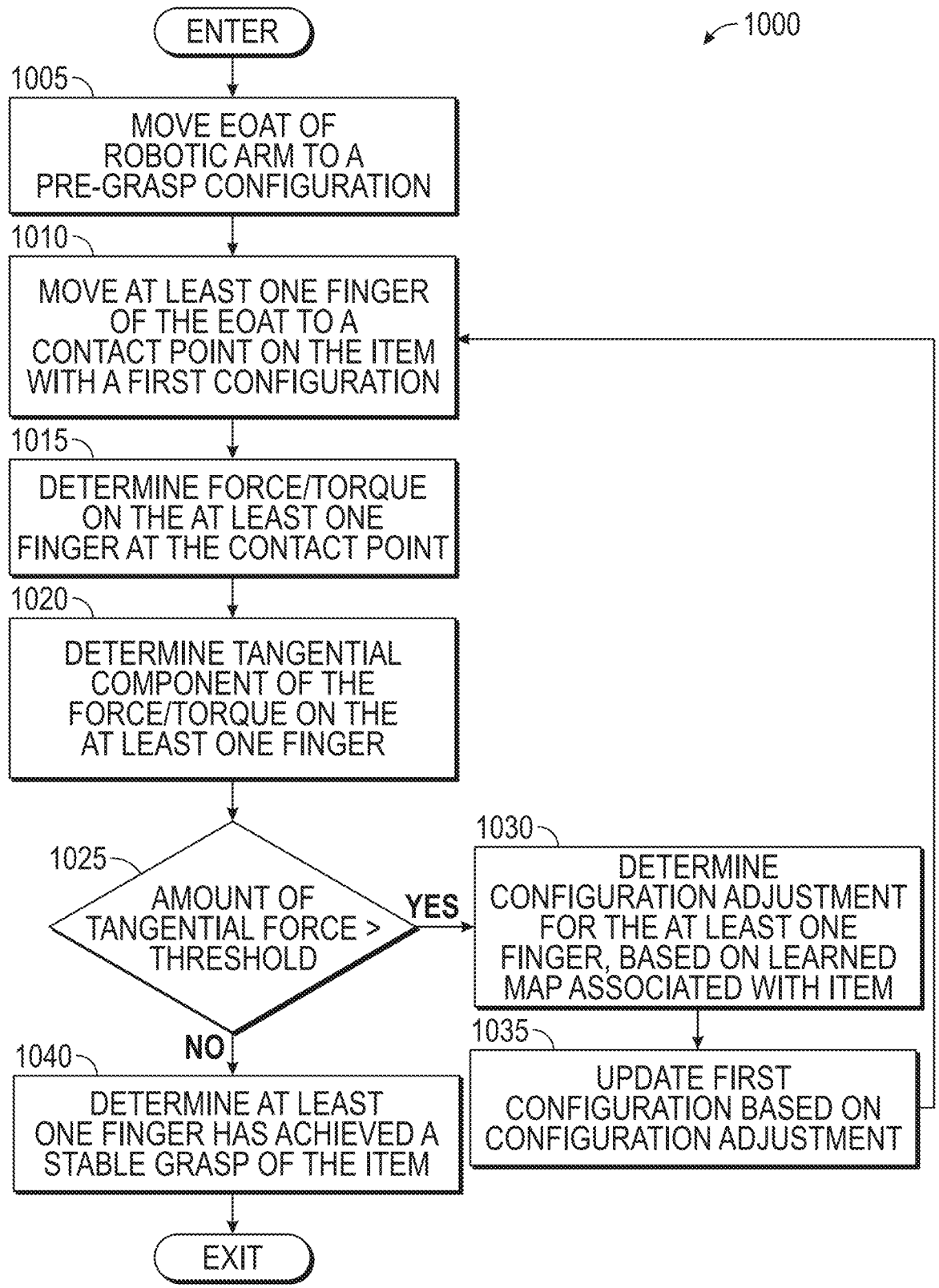
FIG. 10 is a flowchart of a method for adaptively controlling an EOAT of a robotic arm, according to one embodiment.

FIG. 10 is a flowchart of a method 1000 for adaptively controlling an EOAT (e.g., EOAT 140) of a robotic arm (e.g., robotic arm 130), according to one embodiment. The method 1000 may be performed by one or more components of the inventory system 100.

Method 1000 may enter at block 1005, where the controller (e.g., controller 220) moves the EOAT of the robotic arm to a pre-grasp configuration. At block 1010, the controller moves at least one finger (e.g., finger 145) of the EOAT to a contact point (e.g., planar face, insertion hole, etc.) on the item with a first configuration. As noted, the first configuration may be determined based on a priori knowledge of the type, shape, and/or pose of the item.

At block 1015, the controller determines a force/torque on the at least one finger at the contact point (e.g., the force/torque vector on a planar facet of the at least one finger that engages the contact point). At block 1020, the controller determines the tangential component of force/torque on the at least one finger. At block 1025, the controller determines whether the amount of tangential force is greater than a predetermined threshold.

If the amount of tangential force is greater than the predetermined threshold, then the controller determines a configuration adjustment for the at least one finger, based on a learned map (e.g., map 702A, map 702B) associated with the item (block 1030). Using the embodiment in FIGS. 9A-9D as a reference example, in some cases, the operations in block 1030 can include determining the nearest force/torque with the measured force/torque in the learned map and determining an estimated pose of the articulated finger that corresponds to the nearest force/torque. At block 1035, the controller updates the first configuration based on the configuration adjustment. Continuing with the embodiment depicted in FIGS. 9A-9D, the operations in block 1035 can include determining a new first configuration by subtracting the estimated new pose (which may be adjusted by a predefined constant parameter, a, from the current pose of the articulated finger. After block 1035, the method 1000 proceeds to block 1010.

If, at block 1025, the amount of tangential force is less than or equal to the threshold, then the controller can determine that the at least one finger has achieved a stable grasp of the item (block 1040), and the method 1000 may exit.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A robotic system comprising:
   a robotic arm having (i) an end-of-arm-tool configured to grasp an item and (ii) a sensor configured to measure at least one of a force or a torque on the end-of-arm-tool, wherein the end-of-arm-tool comprises:
      a first articulated finger having a first plurality of planar faces arranged in a first non-uniform arrangement on a surface of the first articulated finger, wherein a first planar face has a first shape or size, a second planar face has a second shape or size, and a third planar face has a third shape or size, and wherein the first shape or size is different from the second shape or size, and the second shape or size is different from the third shape or size; and
      a second articulated finger having a second plurality of planar faces arranged in a second non-uniform arrangement on a surface of the second articulated finger, wherein the second non-uniform arrangement is different than the first non-uniform arrangement;
   one or more computer processors; and
   control logic for the robotic arm that, when executed by operation of the one or more computer processors, performs an operation comprising:
      instructing the robotic arm to engage the item at a first contact point on the item with the first articulated finger in a first configuration;
      determining, via the sensor, at least one of a first amount of force or a first amount of torque on a first of the plurality of planar faces of the first articulated finger at the first contact point on the item, wherein determining at least one of the first amount of force or the first amount of torque comprises determining a first amount of tangential force applied to at least one of the plurality of facets;
      upon determining that at least one of the first amount of force or the first amount of torque satisfies one or more predefined criteria, determining a second configuration for engaging the item with the first articulated finger, wherein the one or more predefined criteria comprises the first amount of tangential force exceeding a predefined threshold amount of tangential force; and
      instructing the robotic arm to engage the item with the first articulated finger in the second configuration.

2. The robotic system of claim 1, wherein the robotic arm is instructed to engage the item at the first contact point on the item with the first articulated finger in the second configuration.

3. The robotic system of claim 1, wherein the robotic arm is instructed to engage the item at a second contact point on the item with the first articulated finger in the second configuration.

4. The robotic system of claim 1, wherein the operation further comprises upon determining that at least one of the first amount of force or the first amount of torque does not satisfy the one or more predefined criteria, determining that a stability of the contact of the first planar face with the first contact point exceeds a predefined threshold level of stability.

5. The robotic system of claim 1, wherein the one or more predefined criteria further comprises the first amount of force exceeding a predefined threshold amount of force.

6. The robotic system of claim 1, wherein:
   the first configuration comprises at least one of a first position or a first angle; and
   the second configuration comprises at least one of a second position or a second angle.

7. The robotic system of claim 1, wherein:
   the robotic arm is configured to engage the item by inserting the first articulated finger into a first hole of the item and inserting the second articulated finger into a second hole of the item.

8. A computer-implemented method for adaptively controlling a robotic arm to grasp an item, the computer-implemented method comprising:
   moving the robotic arm to engage an item using at least one articulated finger, wherein the robotic arm comprises an end-effector with a plurality of articulated fingers, wherein the plurality of articulated fingers comprises:
      a first articulated finger having a first plurality of facets arranged in a first non-uniform arrangement on a surface of the first articulated finger, wherein a first facet has a first shape or size, a second facet has a second shape or size, and a third facet has a third shape or size, and wherein the first shape or size is different from the second shape or size, and the second shape or size is different from the third shape or size; and
      a second articulated finger having a second plurality of facets arranged in a second non-uniform arrangement on a surface of the second articulated finger, wherein the second non-uniform arrangement is different than the first non-uniform arrangement;
   determining at least one of an amount of force or an amount of torque applied to the plurality of facets on the surface of the at least one articulated finger while engaging the item using the at least one articulated finger, wherein determining at least one of the amount of force or the amount of torque comprises determining an amount of tangential force applied to at least one of the plurality of facets; and
   adaptively controlling at least one of a position or an orientation of the at least the first articulated finger or the second articulated finger with respect to the item, based on at least the amount of tangential force being greater than a predetermined threshold amount of tangential force.

9. The computer-implemented method of claim 8, wherein each of the first plurality of facets has at least one of a different shape or a different size with respect to another of the first plurality of facets.

10. The computer-implemented method of claim 8, wherein adaptively controlling at least one of the position or the orientation of the at least one articulated finger comprises adjusting at least one of the positions or the orientations to minimize the amount of tangential force applied to the at least one of the plurality of facets.

11. The computer-implemented method of claim 10, wherein the at least one articulated finger engages the item at different facets of the at least one articulated finger while at least one of the position or the orientation of the at least one articulated finger is adjusted.

12. The computer-implemented method of claim 10, further comprising upon determining that the amount of tangential force applied to the at least one of the plurality of facets is below the predetermined threshold amount of tangential force:
   determining that the at least one articulated finger is at a stable position and stable orientation sufficient to grasp the item; and
   refraining from adjusting at least one of the stable position or the stable orientation.

13. The computer-implemented method of claim 10, wherein adjusting at least one of the positions or the orientations is based on a map of force and torque values generated for the at least one articulated finger for an item type corresponding to the item.

14. A non-transitory computer-readable medium containing computer program code that, when executed by operation of one or more computer processors, performs an operation comprising:
   moving the robotic arm to engage an item using at least one articulated finger, wherein the robotic arm comprises an end-effector with a plurality of articulated fingers, wherein the plurality of articulated fingers comprises:
      a first articulated finger having a first plurality of facets arranged in a first non-uniform arrangement on a surface of the first articulated finger, wherein a first facet has a first shape or size, a second facet has a second shape or size, and a third facet has a third shape or size, and wherein the first shape or size is different from the second shape or size, and the second shape or size is different from the third shape or size; and
      a second articulated finger having a second plurality of facets arranged in a second non-uniform arrangement on a surface of the second articulated finger, wherein the second non-uniform arrangement is different than the first non-uniform arrangement;
   determining at least one of an amount of force or an amount of torque applied to the plurality of facets on the surface of the at least one articulated finger while engaging the item using the at least one articulated finger, wherein determining at least one of the amount of force or the amount of torque comprises determining an amount of tangential force applied to at least one of the plurality of facets; and
   adaptively controlling at least one of a position or an orientation of the at least the first articulated finger or the second articulated finger with respect to the item, based on at least the amount of tangential force being greater than a predetermined threshold amount of tangential force.

15. The non-transitory computer-readable medium of claim 14, wherein each of the first plurality of facets has at least one of a different shape or a different size with respect to another of the first plurality of facets.

16. The non-transitory computer-readable medium of claim 14, wherein adaptively controlling at least one of the position or the orientation of the at least one articulated finger comprises adjusting at least one of the positions or the orientations to minimize the amount of tangential force applied to the at least one of the plurality of facets.

17. The non-transitory computer-readable medium of claim 14, the operation further comprising upon determining that the amount of tangential force applied to the at least one of the plurality of facets is below the predetermined threshold amount of tangential force:
   determining that the at least one articulated finger is at a stable position and stable orientation sufficient to grasp the item; and
   refraining from adjusting at least one of the stable positions or the stable orientations.

* * * * *